May 22, 1962

A. E. BACHELET 3,036,163

SIGNALING SYSTEM

Filed May 15, 1959

3 Sheets-Sheet 1

INVENTOR
A. E. BACHELET
BY R. O. Hintz
ATTORNEY

FIG. 4 TRANSLATOR
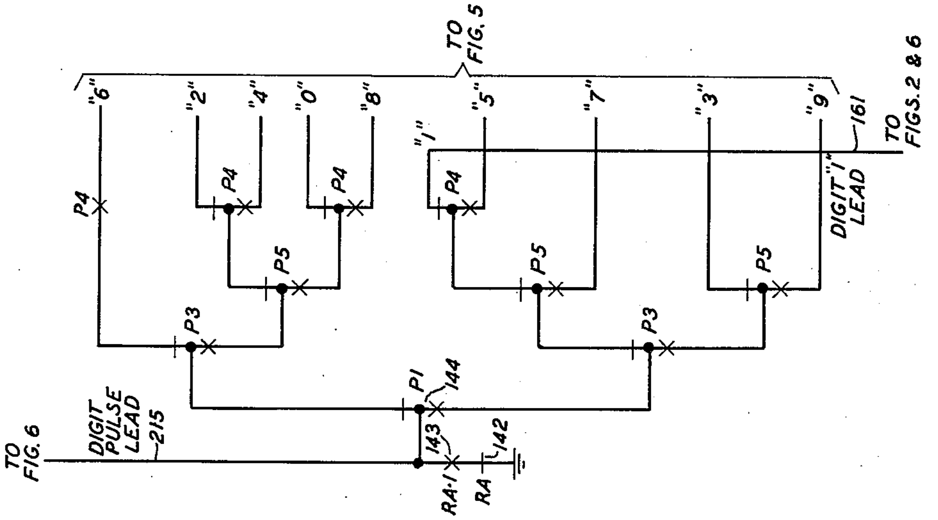
FIG. 3 COUNTING CIRCUIT
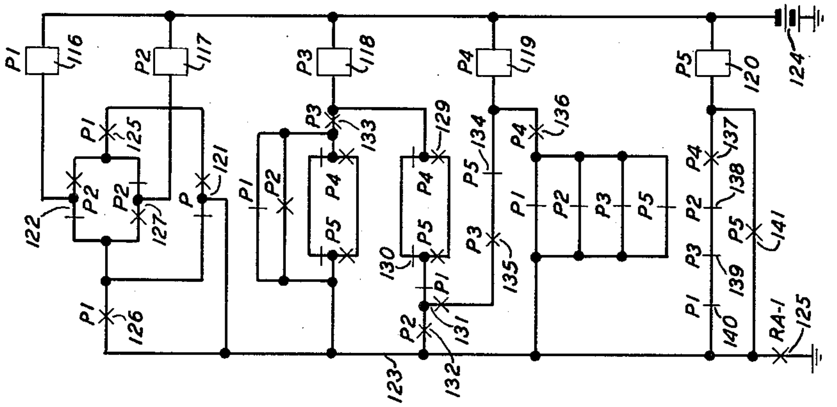
FIG. 2 DIGIT CONTROL CIRCUIT
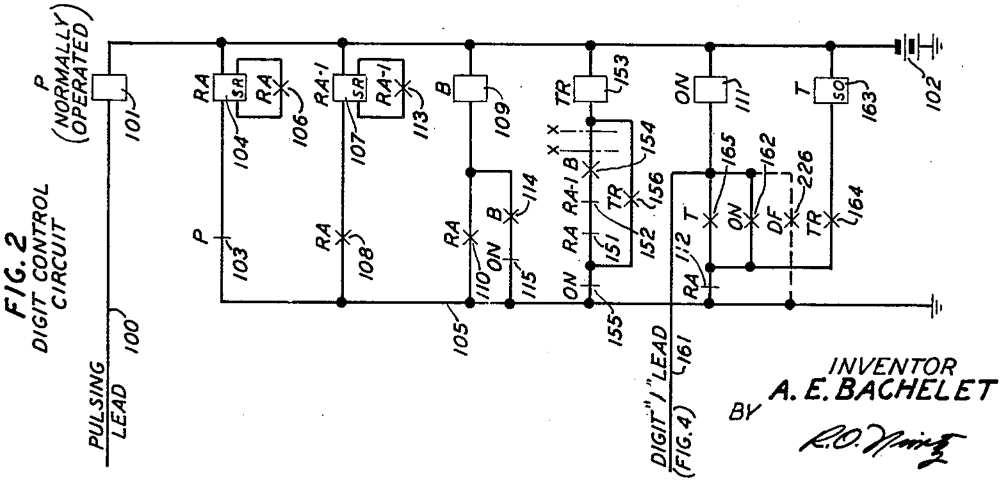
INVENTOR
A. E. BACHELET
BY R.O. [signature]
ATTORNEY May 22, 1962 A. E. BACHELET 3,036,163

SIGNALING SYSTEM

Filed May 15, 1959 3 Sheets-Sheet 3

INTER-AREA CONTROL CIRCUIT

SIGNAL DISTRIBUTING CIRCUIT

INVENTOR
A. E. BACHELET
BY R. O. Nimtz
ATTORNEY

United States Patent Office 3,036,163

Patented May 22, 1962

3,036,163

SIGNALING SYSTEM

Albert E. Bachelet, New York, N.Y., assignor to Bell Telephone Laboratories, Incorporated, New York, N.Y., a corporation of New York Filed May 15, 1959, Ser. No. 813,381

9 Claims. (Cl. 179—84)

This invention relates to selective signaling systems and, more particularly, to multi-party selective signaling in common-line communication systems.

Many forms of common-line communication systems heretofore proposed have utilized various types of selective calling arrangements by which each station on the line may signal any other station on the same line to initiate a conversation. Such systems have utilized dial pulsing and pulse selecting equipment, frequency selective signaling and many other signaling arrangements to perform the calling function.

One of the major disadvantages of all of the heretofore proposed systems has been the difficulty of expanding the system to accommodate large numbers of stations with reasonable economy. In frequency selective equipment, for example, the cost of increasing the number of tones which fall within the limited range of a voice-frequency transmission line may well become prohibitive. Frequency discrimination networks for closely spaced frequencies involve complex construction and reliable safeguards against erroneous responses to tone harmonics. The necessity for adequate tone separation therefore places an inherent limitation on this type of system.

Pulse selective equipment on the other hand, while theoretically capable of handling almost unlimited numbers of unique station identifications, involves the use of extremely costly pulse handling apparatus. This high cost effectively limits the number of digits which can be used in a signaling code and hence the number of stations which can be uniquely identified.

It is an object of the present invention to increase the number of stations which may be economically accommodated in a common-line communication system.

It is a more specific object of the invention to increase the number of stations which can be accommodated by a dial pulse selective signaling system without increasing the number of dial pulse digits.

In accordance with the present invention, one digit of a conventional ten digit dial pulser is reserved for the correction of errors already dialed. A first group of stations, identified by various code combinations of the other nine digits, are signaled in the conventional manner by dial pulsing. A second group of stations, duplicating the codes of the first group, are signaled by interposing the error correction digit among the duplicate dial code digits. The two groups are interconnected by dialing a special inter-area code. In this way, the number of stations which can be handled by the system is effectively doubled without significantly increasing the complexity of the code elements and hence of the pulse handling apparatus.

One feature of the present invention resides in the ability of the members of each group to signal other members of their own group without interference from the other group, provided no inter-group signaling is taking place. Thus, each group effectively comprises a separate, closed signaling system until it becomes necessary to signal between members of the different groups. This is particularly advantageous in systems where a large amount of local communication within each group is contemplated, but where access to the other group is also necessary from time to time.

Another feature of the present invention resides in the use of alternating current signaling along the common transmission line. Since direct current pulsing is not relied on, the geographical separation of the various stations of the system may be greatly extended. This arrangement is advantageous in multistation communication systems used for supervising a large number of geographically separated points, such as railroad, pipeline and aircraft facilities.

These and other objects and features, the nature of the present invention and its various advantages, will appear more fully upon consideration of the accompanying drawings and the following detailed description of the drawings.

Figures 1, 1A:
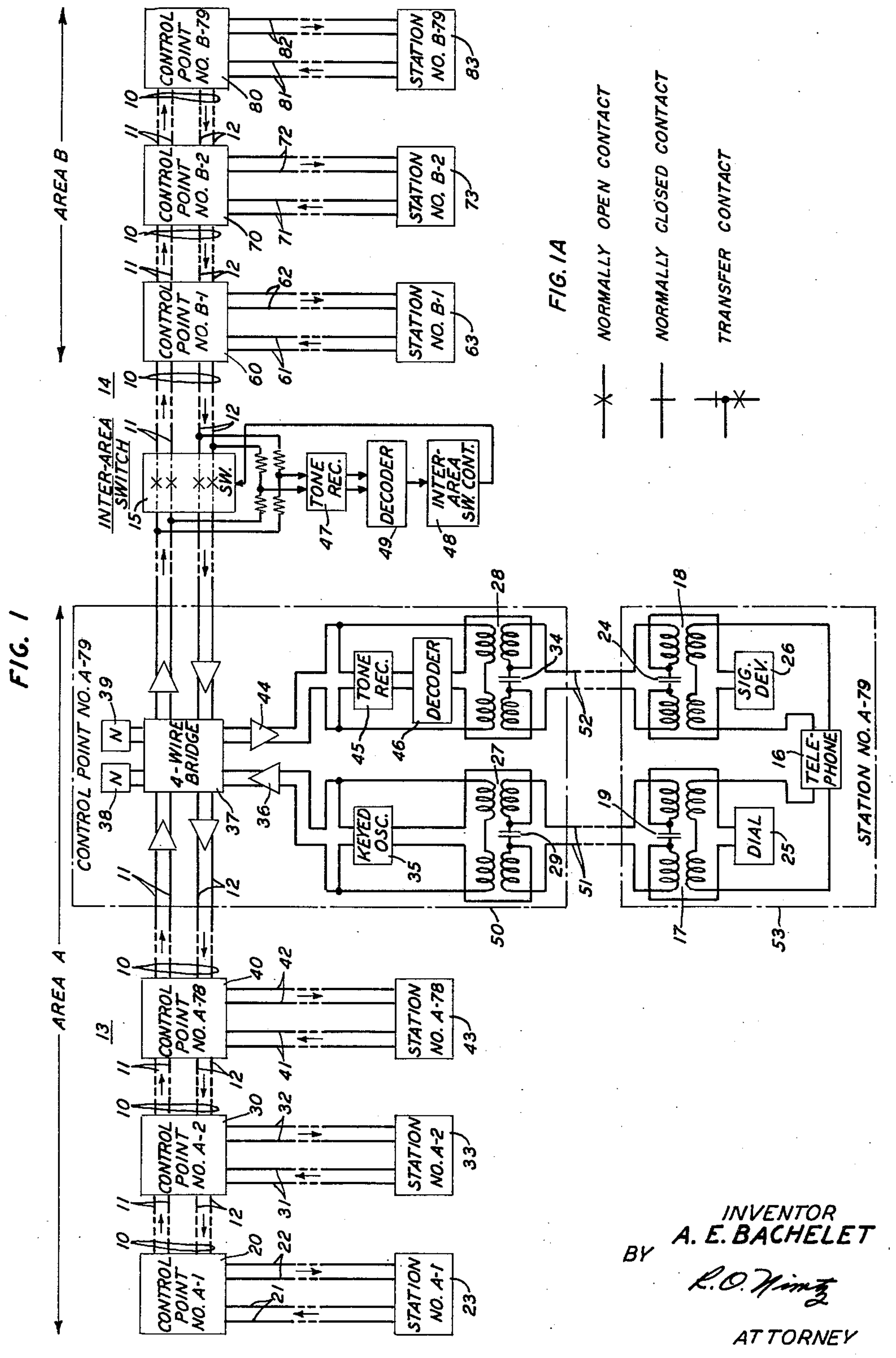
FIG. 1 is a block schematic diagram of a common-line communication system using pulse signaling techniques in accordance with the present invention.
FIG. 1A is a legend identifying certain contact symbols used in FIG. 1 and in the remaining figures.
Figure 6:
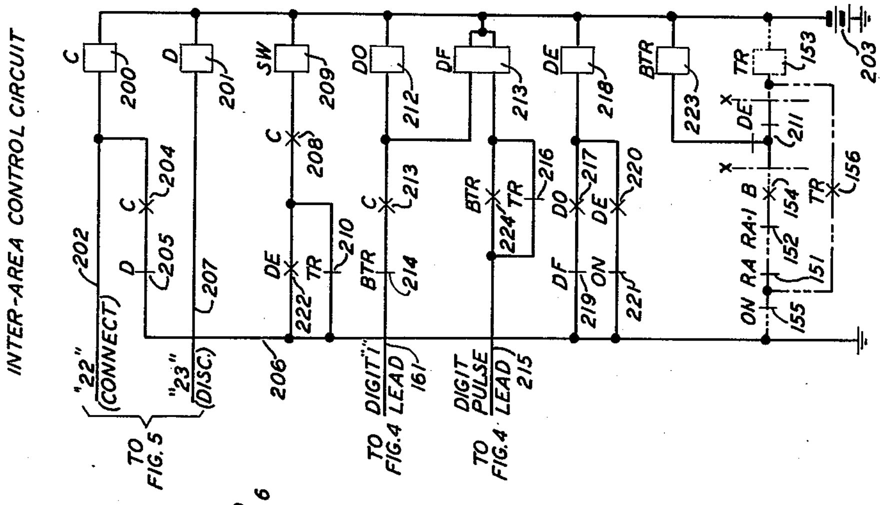

FIGS. 2 through 5, taken together, constitute a schematic diagram of a decoder circuit for use in the communication system of FIG. 1; and FIG. 6 is a schematic diagram of an inter-area control circuit in accordance with the invention for use in the system of FIG. 1.

Referring more particularly to FIG. 1, there is shown a common-line communication system comprising a common backbone transmission facility 10 providing two one-way transmission line pairs 11 and 12. Transmission facility 10 is divided into two sections 13 and 14 by an inter-area switch 15. Sections 13 and 14 are normally disconnected, but may be connected together by the operation of switch 15. Section 13 serves a geographical location identified in the drawing as area A while section 14 serves a separate geographical location identified as area B.

Bridged on transmission facility 10 are a number of control points 20, 30, . . . 40 and 50 in area A and 60, 70, . . . 80 in area B. Indeed, there are seventy-nine such control points in each of the areas A and B. These control points have therefore been labeled A–1 through A–79 and B–1 through B–79. Each of these control points connects at least two one-way local loops to the backbone transmission facility 10. Thus control point 20 connects local loops 21 and 22 to facility 10, control point 30 connects local loops 31 and 32 to facility 10, and so on to control point 80 which connects local loops 81 and 82 to facility 10. Terminating each such pair of local loops is a telephone station such as telephone stations 23, 33, 43, 53, 63, 73 and 83. Since the control points and telephone stations are all similar, only one control point, control point 50, and one telephone station, station 53, have been illustrated in detail.

In general, it can be said that within each area the seventy-nine stations are equipped to communicate with each other over sections 13 and 14, respectively, of the backbone transmission facility 10. That is, each station in area A is able to communicate with any other station in area A over section 13 of facility 10. Similarly, each station in area B is able to communicate with any other station in area B over section 14 of facility 10. As noted above, sections 13 and 14 are normally disconnected and form the common backbone transmission lines for two separate transmission systems.

Transmission facility 10 therefore interconnects a large number of control points and associated stations which may have widely separated geographical locations. Transmission facility 10 may be made up of voice transmission lines, carrier transmission lines, radio relay links or any combination of these or other signal transmission facilities. In general, the most available and suitable facility is used in each link between control points. The control points may, for example, be located at telephone central offices which are interconnected by regular toll facilities.

The local loops may likewise by any available form of transmission facility of any length. Preferably, however, a control point is located reasonably close to each station to serve that station. It is immediately apparent that a transmission system such as that disclosed in FIG. 1 is ideally suitable for vocally monitoring the operation of extensive transportation networks such as railroads, airlines and pipelines. In order for such a communication system to be useful, however, it is necessary that each station be able to signal any other station in the system to call the proper personnel to the telephone. One link in such a system is shown in detail at station A–79 and control point A–79. It is to be understood, however, that each station and control point in the system is similarly equipped.

Station number A–79, shown in block 53 of the drawing, comprises a standard four wire telephone subset 16 which is connected for transmitting through repeating coil 17 to local loop 51 and for receiving through repeating coil 18 to local loop 52. The windings of coils 17 and 18 facing control point 50 are split by capacitors 19 and 24, respectively, to isolate alternating current voice signals and direct current supervisory signals in these windings. A standard dial 25 is connected across capacitor 19 while a standard signaling device 26, such as a bell, a buzzer or a lamp, is connected across capacitor 24.

The break contacts of dial 25 are connected in series with local loop 51 and therefore interrupt the direct current flow in this loop. Direct current supervisory pulses may therefore be transmitted from station circuit 53 to control point 50 over local loop 51. Alternating current voice signals are transmitted over the same loop from telephone 16 through repeating coil 17.

At control point 50, local loops 51 and 52 are terminated in similar repeating coils 27 and 28. The windings of coils 27 and 28 facing station circuit 53 are similarly split by capacitors 29 and 34, respectively. A keyed oscillator 35 is connected across capacitor 29. It can be seen that a direct current signaling circuit extends from dial 25 at station 53 to oscillator 35 at control point 50.

Oscillator 35 may be a single frequency oscillator arranged to be keyed on and off by dial pulses appearing on local loop 51. Alternately, oscillator 35 may be a two-frequency oscillator arranged to be shifted in frequency by dial pulses. In any event, the oscillator circuit 35 is adapted to convert direct current supervisory signals on local loop 52 to equivalent alternating current signals for transmission on facility 10.

To this end, the output of oscillator 35 is connected through an amplifier 36 to a four-wire bridge circuit 37. Bridge circuit 37 is a conventional hybrid type network which couples the output of amplifier 36 to transmission lines 11 and 12. A pair of balancing networks 38 and 39 are used to terminate two arms of bridge 37. Four of the remaining arms are connected to the input and output portions of transmission lines 11 and 12.

It can be seen that the operation of dial 25 at station 53 serves to transmit alternating current pulses along the backbone transmission facility 10 corresponding to the digits dialed. The circuit is arranged so that alternating current tones are present on the backbone line only during dialing. These alternating current pulses are used to signal the other stations in the line in the following manner, described, for convenience, with respect to the detailed illustration of control point A–79.

The remaining arm of bridge circuit 37 is connected through amplifier 44 to the input of a tone receiving circuit 45. Tone receiver 45 is adapted to detect the alternating current tone or tones generated in the oscillators, like oscillator 35, in all of the control points of the system. Receiver 45 converts these tones to direct current pulses and applies these pulses to a decoding circuit 46.

Decoder 46 contains pulse counting and registering equipment suitable for decoding and recognizing any one of eighty-one two-digit codes dialed from any one of the station circuits. Decoder 46 may comprise, for example, stepping switches which are stepped along by the decoded dial pulses. Decoder 46 may also comprise a relay counting and translator circuit such as that shown in J. Michal et al. Patent 2,722,675, issued November 1, 1955. One such pulse decoding circuit will be further described below.

Decoder 46 in control point 50 is wired to produce an output only when the digits received correspond to the code identification of the associated telephone station 53. When this code is received, decoder 46 applies a direct current across capacitor 34 and thus to local loop 52. At station 53, this direct current energizes signaling device 26, which operates to signal the attendant personnel that someone wishes to speak to them on the telephone. Obvious talking and listening paths connect the telephone 16 with the backbone transmission facility 10.

The remaining seventy-eight control points in area A are very similar to control point A–79. Each includes a four-wire bridge, a signaling oscillator, a signaling receiver and a decoder. Each such decoder registers all of the code digits received over backbone facility 10 but each is wired to produce an output for a different one of the possible codes. In this way, any station in area A can signal any other station in area A simply by dialing in appropriate two-digit code. The calling party, of course, first monitors the line to ascertain that it is not already in use.

The seventy-nine codes for identifying the seventy-nine stations in area A are made up of various combinations of the digits "2" through "0." The digit "1" is not used in these codes. On the contrary, the digit "1" is used as an error correction signal. Furthermore, the codes "22" and "23" are reserved for inter-area switching in the manner to be described below.

Since the backbone transmission facility 10 is used in common by a large number of stations, it is not possible to use off-normal signals to release the decoders at the various control points. All decoders at the control point servicing the stations are therefore wired so that the receipt of the digit "1" will release them. Thus, if a mistake is made in dialing, it is merely necessary to dial the digit "1" to erase the erroneous digit or digits and restore the decoders to normal.

The control points and station circuits in area B are exact duplicates of those in area A. That is, area B includes seventy-nine control points and seventy-nine associated station circuits which employ exactly the same station identification codes as those in area A. Since area A and area B are normally disconnected at inter-area switch 15, however, stations in area B are able to communicate with the other stations in area B without interference from area A. Hence, with inter-area switch 15 unoperated, two identical common-line transmission systems are provided, one in area A and one in area B. These two systems can operate entirely independently within their own areas.

It is to be understood that the system shown in FIG. 1 discloses only one station circuit for each control point merely as a matter of convenience. It is clear that if a particular system required more than one station in a given location, all of these stations could be served by the same control point. A local loop and a station circuit could, for example, be connected to four-wire bridge 37 in the place of balancing networks 38 and 39. A single signaling oscillator, signaling receiver and decoder could then be used for all of the station circuits served by the control point.

In some situations, the system including only seventy-nine stations would be inadequate to serve the entire transportation system. Some such systems, for example, are continental in scope, extending for thousands of miles, and require more than seventy-nine supervisory stations. More stations could be added merely by increasing the number of digits in the signaling codes beyond two. Such an increase, however, requires that each of the decoding circuits at the control points be capable of registering the larger number of digits. As the number of digits to be registered increases, the amount of equipment required to do the registering also increases. Providing the equipment required to register more than two digits at each control point has been found to be uneconomical in terms of the alternate types of communication systems available.

In accordance with the present invention, the number of stations which can be uniquely signaled over a common transmission line is doubled without a significant increase in the amount of equipment required. As shown in FIG. 1, two identical sventy-nine station systems, one in area A and one in area B, can be interconnected by means of an inter-area switch 15. A signaling tone receiver 47 simultaneously monitors the receiving line 12 from area B and the receiving line 11 from area A and detects all of the alternating current pulses generated in the station equipment in area A and in area B. Receiver 47 converts these alternating current pulses to direct current pulses and applies these direct current pulses to decoder 49, the output of which is applied to switch control circuit 48. Switch control circuit 48, together with decoder 49, in the manner to be described in more detail hereafter, includes the equipment necessary to detect and register all of the digits received. Furthermore, control circuit 48 is arranged to operate the normally open contacts within inter-area switch 15 each time a code "22" is received and to release inter-area switch 15 each time a code "23" is received. Furthermore, inter-area switch 15 is arranged to automatically release for a brief period following the first station identification digit to follow the inter-area connect digits "2." Control circuit 48, therefore, deletes an error correction digit interposed between two station identification code digits and transmits the remaining two digits to the area in which the codes did not originate.

It can be seen that a station area A which wishes to communicate with a station in area B merely has to dial the inter-area code "22" and then interpose the error correction digit "1" between the two code digits of the area B station to be contacted. The error correction digit causes all of the decoders in area A to release the first digit. Since the last digit is an incomplete code, these decoders can be arranged to "time-out" after a preselected period in which the second digit should have been dialed. Therefore, none of the stations in area A responds to the dialed digits.

The control circuit 48, however, deletes the error correction digit in passing the code into area B. The stations in area B are therefore able to respond in the normal fashion to the remaining two digits and the appropriate station is signaled. At the same time, control circuit 48 operates inter-area switch 15 and interconnects area A and area B to permit a conversation between these two areas. At the close of the conversation, the calling party dials the inter-area disconnect code "23" which now releases inter-area switch 15 and restores the control circuits to normal. Separate conversations can therefore again take place independently in areas A and B.

Figure 5:
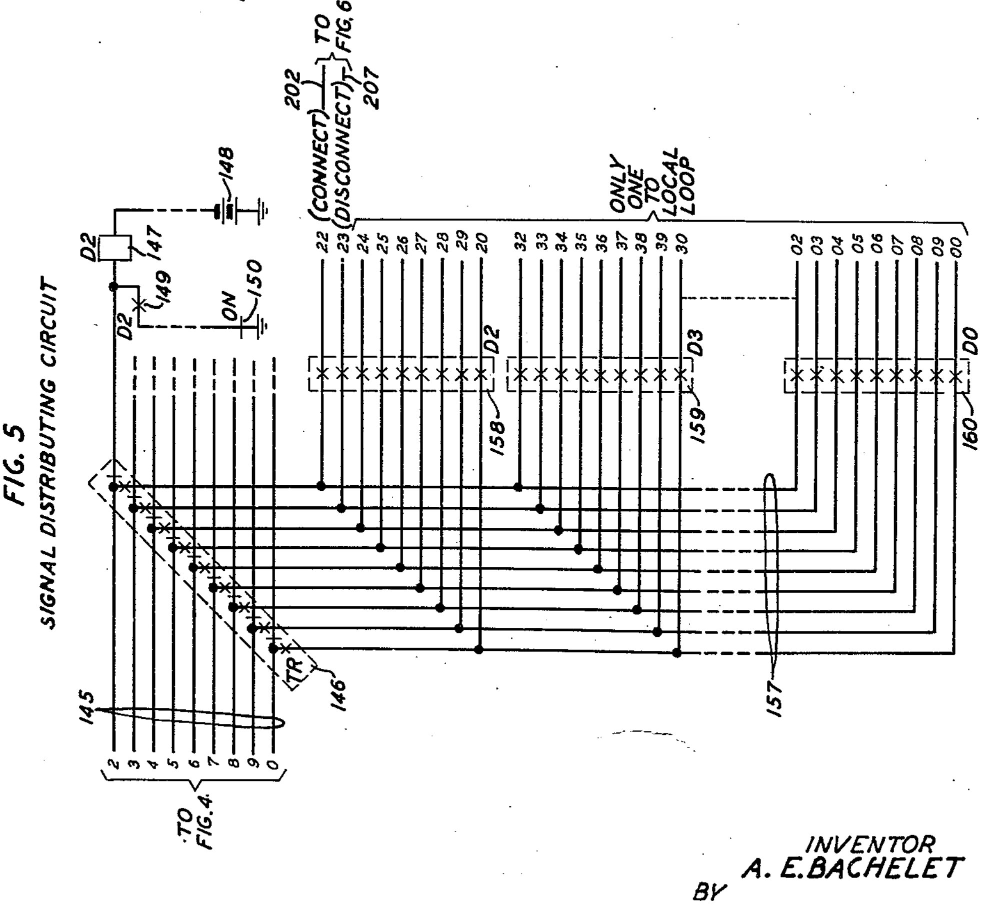

Referring to FIGS. 2 through 5, there is shown a decoding circuit suitable for use in the common-line communication system of FIG. 1 and comprising a Digit Control circuit (FIG. 2), a Relay Counting circuit (FIG. 3), a Translator circuit (FIG. 4) and a Signal Distributing circuit (FIG. 5). These circuits are shown using a detached contact convention in which a rectangle represents a relay winding and all of the associated structure except the contacts which are operated by that relay winding. As illustrated in the legend of FIG. 1A, a set of normally open, or make, contacts are shown unconnected with the relay structure which operates them and are represented by two short crossed lines through the center of which passes a solid line representing the connecting leads. A set of normally closed, or break, contacts is shown by a short line perpendicular to and crossing a solid line representing the connecting leads to the set of break contacts. A set of transfer contacts, i.e., a movable contact moving from one fixed contact to another fixed contact upon the operation of the relay, is shown by two solid lines, representing connecting leads, which meet at a point from which a third solid line extends. A make contact is drawn on one of the lines, a break contact on another of the lines, and no contact is drawn on the third line. According to the convention, the lead with no contact representation is transferred from the lead including the break contact to the lead including the make contact upon actuation of the relay.

The capital letters and numerals associated with each rectangle identify the particular relay. Corresponding letters and numerals adjacent to a set of contacts identify those contacts as being operated by the similarly identified relay winding. Other circuit elements are shown in the usual form.

Referring more particularly to FIG. 2, there is shown a Digit Control circuit comprising several relays and associated operating contacts. Direct current pulses obtained from a tone receiver such as receiver 45 in FIG. 1, appear on pulsing lead 100 in the form of alternate ground and open circuit conditions. A ground has been arbitrarily chosen to represent the normal condition. Pulses therefore appear as momentary open circuits to this ground. A pulsing (P) relay 101 is connected between a battery 102 and this ground and hence is normally operated. Each pulse on lead 100 momentarily releases and then re-operates P relay 101. A P break contact 103 which is normally open since P relay 101 is normally operated, closes at the beginning of each pulse and reopens at the end of each pulse. When closed, P contact 103 provides an operate path for slow release RA relay 104 from battery 102 to ground bus 105. At RA make contact 106, RA relay 104 short-circuits its lower winding to make it slow to release so that it will remain operated during interruptions of its operating circuit by the successive release of P relay 101 between the dial pulses of a digit.

When RA relay 104 operates, it operates slow release RA–1 relay 107 at RA make contact 108, operates B relay 109 at RA make contact 110, and releases ON relay 111 at RA break contact 112. ON relay 111 is an off-normal relay which remains operated while the circuits are not in use, but which is released upon the arrival of the first digit pulse. Relays 107 and 109 are special purpose relays for a timing function and a hold over function and will be further described below. RA–1 relay 107 operates RA–1 make contact 113 to short circuit its lower winding to make it slow to release. B relay 109 locks through B make contact 114 and ON break contact 115 to ground bus 105.

Referring now to FIG. 3, there is shown a relay counting circuit comprising five counting relays, P1 relay 116, P2 relay 117, P3 relay 118, P4 relay 119 and P5 relay 120. P1 relay 116 and P2 relay 117 are used as a pulse divider, and P3 relay 118, P4 relay 119 and P5 relay 120 are used to differentiate between the different pairs of pulses. When P relay 101 initially releases, P1 relay 116 operates from battery 124 through P transfer contacts 121 and P2 transfer contacts 122 to ground bus 123 provided by the closing of RA–1 make contact 125. P1 relay 116 locks through P1 make contact 126. When P relay 101 reoperates at the end of the first pulse, P2 relay 117 operates through P2 transfer contacts 127, P1 make contact 125 and P transfer contacts 121, and locks through P2 transfer contact 127. Simultaneously, P2 transfer contacts 122 transfer the P1 relay 116 operate circuit to the make portion of P transfer contacts 121.

When P relay 101 releases on the next pulse, P1 relay 116 is released at P transfer contacts 121. P2 relay 117 holds through P2 transfer contacts 127 and the break portion of P transfer contacts 121. When P relay 101 reoperates at the end of the second pulse, P2 relay 117 therefore releases, restoring the P1 and P2 operating circuit to normal.

On each succeeding two pulses, P1 relay 116 and P2 relay 117 follow the same sequence, that is, P1 operates at the beginning of the first pulse, P2 operates at the end of the first pulse, P1 releases at the beginning of the second pulse and P2 releases at the end of the second pulse.

P3 relay 118 operates when P2 relay 117 is operated and P1 relay 116 is released through an operate path including P4 transfer contacts 129, P5 transfer contacts 130, P transfer contacts 131 and P2 make contact 132. P3 relay 118 locks through P3 make contact 133 to the various P1, P2, P4 and P5 contacts shown and remains operated until the fifth pulse appears.

P4 relay 119 operates when P3 relay 118, P1 relay 116 and P2 relay 117 are operated through P5 break contact 134, P3 make contact 135, P1 transfer contacts 131 and P2 make contact 132. P4 relay 119 locks through P4 make contact 136 and the various P1, P2, P3 and P5 break contacts shown and remains operated until the ninth pulse. P5 relay 120 operates through P4 make contact 137, P2 break contact 138, P3 break contact 139 and P1 break contact 140, on the sixth pulse and locks through P5 make contact 141 until the counting cycle is over and RA relay 104 releases.

The above-described counting circuit is disclosed and described in detail in J. Michal et al. Patent 2,722,675, issued November 1, 1955, and will not be further described here. The following table summarizes the sequence of operation of these relays.

*Relays*

| Pulse No. | P | P1 | P2 | P3 | P4 | P5 |
|---|---|---|---|---|---|---|
| 1 | R | 0 | R | R | R | R |
| | 0 | 0 | 0 | R | R | R |
| 2 | R | R | 0 | 0 | R | R |
| | 0 | R | R | 0 | R | R |
| 3 | R | 0 | R | 0 | R | R |
| | 0 | 0 | 0 | 0 | 0 | R |
| 4 | R | R | 0 | 0 | 0 | R |
| | 0 | R | R | 0 | 0 | R |
| 5 | R | 0 | R | R | 0 | R |
| | 0 | 0 | 0 | R | 0 | R |
| 6 | R | R | 0 | R | 0 | R |
| | 0 | R | R | R | 0 | 0 |
| 7 | R | 0 | R | R | 0 | 0 |
| | 0 | 0 | 0 | R | 0 | 0 |
| 8 | R | R | 0 | 0 | 0 | 0 |
| | 0 | R | R | 0 | 0 | 0 |
| 9 | R | 0 | R | 0 | 0 | 0 |
| | 0 | 0 | 0 | 0 | R | 0 |
| 10 | R | R | 0 | 0 | R | 0 |
| | 0 | R | R | 0 | R | 0 |

When a digit ends, P relay 101 remains operated for a long enough time to permit RA relay 104 to release. When RA relay 104 releases, RA–1 relay 107, energized at make contact 108, after a time, releases. The interval between the release of RA relay 104 and RA–1 relay 107 is the digit pulsing interval and is used as follows.

In FIG. 4 there is shown a translating circuit for translating the permutations of the operate conditions of counting relays P1 through P5 into signals on one out of ten digit leads. Ground is applied through RA break contact 142 and RA–1 make contact 143 to P1 transfer contacts 144. It will be noted that ground is supplied to P1 contacts 144 only during the digit pulsing interval, i.e., when RA relay 104 is released and RA–1 relay 107 is still operated.

It will be further noted that the permutations of operated and released counting relays illustrated in the above table presents a unique combination at the end of each of the dial pulses. The translator of FIG. 4 uses this unique combination to ground the proper one of the digit leads corresponding to the number of dial pulses, but only during the digit pulsing interval. The ground paths provided by each of these combinations will be apparent by inspection and will therefore not be further described here.

Turning to FIG. 5 of the drawings, there is shown a signal distributing circuit which selects the proper one out of eighty-one signaling leads to be energized for signaling purposes. Thus the the nine digit leads 145 from the translator of FIG. 4 are applied through the TR transfer contacts within dashed rectangle 146 to respective ones of nine digit register relays. Since all of these digit register relays are similar, only one of them, the D2 digit registering relay has been illustrated.

If the counting circuit of FIG. 3 has counted two pulses, for example, the translator of FIG. 4 will ground the digit "2" lead for the digit pulsing interval. This ground will operate D2 relay 147 from battery 148 and close D2 make contact 149 to lock D2 relay 147 to the off normal ground provided by ON break contact 150. If the number of received pulses is other than two, the appropriate digit registering relay will operate and lock to the same off-normal ground. The first digit of the number dialed has therefore been registered.

Returning to FIG. 2, the release of RA relay 104 closes RA break contact 151 and the release of RA–1 relay 107, after the digit pulsing interval, closes RA–1 break contact 152. TR relay 153 therefore operates through B make contact 154, RA–1 break contact 152 and RA break contact 151 to the off-normal ground provided by ON break contact 155 and locks through TR make contact 156 to this same off-normal ground.

The operation of TR relay 153 signifies that the first digit of a dialed code has been received and that the circuits are ready to receive the second digit. The release of RA–1 relay 107, following the digit pulsing interval, releases the counting circuit of FIG. 3 at RA–1 make contact 125 and releases the translating circuit of FIG. 4 at RA–1 make contact 143. The operation of TR relay 153 transfers the nine digit leads 145 in FIG. 5 from the digit register relays to nine signaling busses 157, one for each of the nine possible first digits.

When the dial pulses representing the second digit are received, they are counted in the counting circuit of FIG. 3 in the same manner as the pulses of the first digit. The translator of FIG. 4 operates in the same fashion to ground one of the ten digit leads during the digit pulsing interval. In FIG. 5, this ground is applied through the TR transfer contacts 146 to signaling busses 157. Connected to signaling busses 157 are eighty-one signaling leads, one for each of the possible two-digit codes. Nine of these signaling leads, one from each bus, are applied to each of nine banks of break contacts, such as banks 158, 159, . . . 160. Each of banks 158 through 160 is operated by one of the digit registering relays such as D2 relay 147. During the digit pulsing interval, therefore, only one of the eighty-one signaling leads will be grounded. In the system of FIG. 1, only one of these signaling leads will be wired to apply this ground as a calling signal to the local loop. Only the called station will therefore be signaled.

Returning to the digit control circuit of FIG. 2, it can be seen that many of the control relays are locked through off-normal ground by means of appropriate ON break contacts. Indeed, all of the registering relays are locked to an off-normal ground. Thus B relay 109 is locked through ON break contact 115; TR relay 153 is locked through ON break contact 155 and the digit registering relays of FIG. 5, such as D2 relay 147, are locked through ON break contact 150. It is therefore apparent that the operation of ON relay 111 will restore the decoding circuits to normal.

ON relay 111 is simultaneously under the control of a timing function and of an error correction digit. If the digit "1" is dialed at any time, the digit "1" lead 161 in the translator of FIG. 4 will be grounded. In FIG. 2 it can be seen that this ground will operate ON relay 111 which will lock through ON make contact 162 and RA break contact 112 to ground bus 105. ON relay 111 will remain operated until a new digit is dialed and RA break contact 112 again opens.

ON relay 111 is also under the control of a timing (T) relay 163. T relay 163 is of the slow-to-operate type and requires, in the preferred embodiment, about six seconds to operate. T relay 163 may therefore conveniently be of the thermal type.

Following the registering of the first digit of a code, when TR relay 153 operates, TR make contact 164 closes to energize T relay 163. T relay 163 does not operate, however, for six seconds. If the second digit of a code is received during this interval, RA break contact 112 will open and de-energize T relay 163. If the second digit is not received during the timing interval, T relay 163 operates to close T make contact 165. ON relay 111 will operate through T make contact 165 and lock through ON make contact 162 to restore the circuits to normal. ON relay 111 will not release again until the receipt of dial pulses again opens RA break contact 112.

It can be seen from the above description that if the first digit of a code is followed by either the digit "1" or by a six second interval without any digits, the decoding circuits will restore to normal. If a mistake was made in dialing the first digit, it is therefore merely necessary to wait the six seconds and dial again. If faster service is required, the digit "1" can immediately be dialed and followed immediately by the correct digits. It is therefore unnecessary to tie up the common-line transmission facilities for unduly long dialing intervals.

Having described a decoding circuit suitable for any of the decoders in the control points of the system of FIG. 1, an inter-area connecting circuit also suitable for the system of FIG. 1 will now be described. As noted with respect to FIG. 1, both area A and area B are continuously monitored by a tone receiver 47. All of the codes dialed in either area A or area B are therefore received and detected in receiver 47. These dialing tones are converted to direct current pulses and applied to a decoder 49.

Decoder 49 is, in the main, identical to the control point decoders such as decoder 46 in control point 50. A few significant modifications, to be described below, are made in decoder 49 to provide a suitable inter-area switching control.

It will be noted in FIG. 5 that two of the possible eighty-one two-digit codes have been reserved for inter-area switching. Thus the code "22" is reserved for connecting area A and area B together and the code "23" is reserved for disconnecting areas A and B once they are interconnected. The inter-area switch control circuit 48 (FIG. 1) is illustrated in detail in FIG. 6. This inter-area control circuit utilized the above inter-area codes and other signals to connect the areas together when an inter-area call is initiated, to delete an error correction digit interposed between two code digits, and to disconnect the two areas after the completion of the inter-area call.

Referring to FIG. 6 of the drawings, there is shown an inter-area control circuit comprising a plurality of control relays including connect (C) relay 200 and disconnect (D) relay 201. C relay 200 is operated from battery 203 to the momentary ground applied to connect signal lead 202 when the connect code "22" is received at the inter-area decoder 49 (FIG. 1). C relay 200 locks through C make contact 204 and D break contact 205 to ground bus 206. D relay 201 is operated from battery 203 to the momentary ground applied to disconnect signal lead 207 when the disconnect code "23" is received at the inter-area decoder 49.

Assuming that an inter-area connect code "22" is received to initiate an inter-area call, C relay 200 operates and locks through the D break contact 205. C make contact 208 closes to operate the inter-area switching (SW) relay 209 through TR break contact 210. It will be noted in FIG. 1 that SW relay 209 closes SW make contacts in the inter-area switch 15 to connect the two areas together.

In order to signal from area A to area B, for example, the calling station in area A first dials the inter-area connect code "22" to connect the two areas together as described above. In accordance with the present invention, the calling station now dials the code of the area B station to be called, interposing the error correction digit "1" between the two station identification digits.

The first station identification digit is received and registered by all of the decoders in both area A and area B since these areas are now connected together. TR relay 153 therefore operates in the inter-area decoder through ON break contact 155, RA break contact 151, RA–1 break contact 152, B make contact 154 and DE transfer contacts 211. Most of this operate path for TR relay 153 is shown in FIG. 2. For convenience, however, it has been repeated in dashed lines in FIG. 6. The portion of the operate path for TR relay 153 (FIG. 2) shown between the dashed lines labeled X is modified in the inter-area decoder 49 in the manner shown in FIG. 6. That is, TR relay 153 operates through DE transfer contacts 211 (FIG. 6) as well as the above described ON, RA, RA–1 and B contacts.

The operation of TR relay 153 after the first station identification digit is received opens TR break contact 210 and releases SW relay 209. The SW make contacts in inter-area switch 15 (FIG. 1) therefore reopen and the areas are again disconnected.

The next digit to be received on inter-area calls is the error correction digit "1." Since the areas are now disconnected, only the decoders in the originating area, area A, and the inter-area decoder 49 receive the error correction digit. The station decoders in area A release in the manner described with reference to FIG. 2. The first station identification digit, previously registered, is therefore erased in these decoders.

In the inter-area decoder 49, the digit "1" lead is wired to the inter-area control circuit of FIG. 6 rather than to the off-normal relay 111. The ground condition on the digit "1" lead 161 during the digit pulsing interval is simultaneously applied to D0 relay 212 and one winding of differential (DF) relay 213 through C make contact 214 and BTR break contact 214. D0 relay 212 momentarily operates to this ground. DF relay 213, however, at the same time the digit "1" ground is applied to its upper winding, has a digit ground from digit pulse lead 215 (FIG. 4) applied to its lower winding through TR break contact 216. Since DF relay 213 is differentially connected, this simultaneous energization of its two windings does not cause the relay to operate.

The momentary operation of D0 relay 212 closes D0 make contact 217 which operates DE relay 218 through DF break contact 219. DE relay 218 locks through DE make contact 220 to the off-normal ground provided by ON break contact 221.

The operation of DE relay 218 closes DE make contact 222 to reoperate SW relay 209. The inter-area switch 15 therefore reoperates to reconnect area A and area B together. Since the error connection digit has now terminated, however, this digit does not enter area B. The above sequence therefore has the effect of opening the interarea switch 15 just long enough to delete the error correction digit when it is interposed between the two station identification digits.

The operation of DE relay 218 also operates DE transfer contacts 211 to transfer the ground which has operated TR relay 153 to BTR relay 223. BTR relay 223 therefore operates and closes BTR make contact 224 and opens BTR break contact 214. TR relay 153 remains locked through TR make contact 156.

The third digit to be dialed, representing the second station identification digit, is received and registered in all of the decoders in area A and area B. Since the first digit has been erased from the decoders of area A, however, none of the area A stations are signaled. After a six second time-out interval, the decoders in area A also release this second digit.

In area B, where the error correction digit has not been received and hence the first station identification digit is still registered, the appropriate signaling lead is grounded to signal the called station. The called party in area B therefore picks up his telephone and begins the conversation.

When the third digit is received in the inter-area decoder 49, the digit pulse lead 215 is grounded for the digit pulsing interval. DF relay 213 momentarily operates to this ground through BTR make contact 224. The upper winding of DF relay remains unenergized since BTR break contact 214 is open. DF break contact 219 therefore opens and, as shown in dashed lines in FIG. 2, DF make contact 226 momentarily closes to operate ON relay 111. The operation of ON relay 111 restores the inter-area decoder 49 to normal, releases DE relay 218 at ON break contact 221 and releases TR relay 153 at ON break contact 155. SW relay 209, which would otherwise be released at DE make contact 222, holds through TR break contact 210. BTR relay 223 is released at DE transfer contacts 211.

At the end of the inter-area call, the calling party dials the inter-area disconnect code "23." This code momentarily grounds disconnect signal lead 207 to momentarily operate D relay 201. D break contact 205 therefore opens to release C relay 200. The release of C relay 200 opens C make contact 208 to release SW relay 209. The inter-area SW contacts at switch 15 therefore open to disconnect the two areas. The inter-area control circuit is now restored to normal and will wait for the next inter-area call.

It can be seen that the inter-area control circuit of FIG. 6, together with the modified decoder circuits, operates to connect the two areas together on the receipt of the inter-area connect code, to delete the error correction digit from the code transmitted out of the originating area, and to disconnect the two areas on the receipt of the inter-area disconnect code. It is to be understood that the circuits described will operate equally well for inter-area calls originated in area B as well as area A. Furthermore, the error correction, connect and disconnect codes mentioned are only convenient illustrations of the operation of the circuits of the invention and should not be taken as limiting.

From the above description, it is apparent that the number of stations in the overall common-line communication system has been almost doubled without any increase in the number of signaling digits. Furthermore, the equipment at each station and each control point is the same as every other station and control point except for the cross wiring of the decoders. This large extension in the capacity of the system has been obtained merely by providing an extra inter-area decoder and the associated control circuits of FIG. 6. Furthermore, as previously described, each area of the system can operate independently when no inter-area calls are in progress.

It is to be understood that the above arrangements for extending a common-line communication system into a second area can be repeated an indefinite number of times. That is, separate area codes could be used to extend a call from a first area to a second area, then from a second area to a third area, and so forth. The correction digit would then be deleted only in the last or called area. All of the decoders in the other areas would therefore release after the first station identification code digit and only the called area would respond.

It is to be further understood that the above described arrangements are merely illustrative of one of the many possible applications of the principles of the invention. Numerous and varied other arrangements in accordance with these principles may readily be devised by those skilled in the art without departing from the spirit or the scope of the invention.

What is claimed is:

1. A common-line communication system comprising a plurality of multistation telephone lines, a plurality of telephone stations on each of said lines, means at each of said stations for selectively generating calling codes and control codes, means individual to said stations and responsive to each calling code for registering said code and signaling a unique one of said stations on each of said lines, means responsive to a first control code for releasing codes stored in each of said registering means, switching means, means responsive to a second control code for enabling said switching means to interconnect at least two of said lines in tandem, means responsive to a third control code for disabling said switching means to disconnect connected ones of said lines, and means responsive to a predetermined pattern of said control codes for momentarily disabling said switching means to delete said first control code otherwise transmitted by said switching means.

2. The common-line communication system according to claim 1 wherein each of said code generating means includes means for applying alternating current signaling tones to one of said lines.

3. A common-line communication system comprising a plurality of stations arranged in groups, means at each of said stations for selectively generating a plurality of signaling codes, a station in each group being responsive to one of said signaling codes, means responsive to a first one of said signaling codes for rendering each of said stations unresponsive to others of said signaling codes, switching means, means responsive to a second one of said signaling codes for enabling said switching means to connect all of said groups in tandem, and means responsive to a predetermined pattern of said signaling codes for momentarily disabling said switching means to delete said first signaling code otherwise transmitted by said switching means.

4. The common-line communication system according to claim 3 wherein each of said code generating means comprises dialing means for generating multi-digit signaling codes and wherein said first signaling code comprises a single digit.

5. In a first multistation communication system having a plurality of stations connected to a common transmission line, means for generating calling digits and an error correction digit, means responsive to said calling digits for registering said digits and signaling the called one of said stations, means responsive to said error correction digit for releasing said registering means, a second multistation communication system having a plurality of stations utilizing the same calling digits as said first system, and means for extending calls to said second multistation communication system, said last-named means comprising switching means for connecting said systems in tandem, and means operative only when said systems are connected in tandem to momentarily disable said switching means to prevent transmission of said error correction digit between said first and second systems.

6. A common-line communication system comprising a plurality of multistation telephone lines, a plurality of telephone stations on each of said lines, dialing means at each of said stations for selectively generating two-digit signaling codes, means within each of said pluralities of stations responsive to selected signaling codes for calling a station on each of said lines, means responsive to a supervisory digit for disabling each of said calling means, means responsive to one of said signaling codes for connecting said lines in tandem, and means responsive to a preselected pattern of said signaling codes for momentarily disconnecting only one of said telephone lines to delete a supervisory digit interposed between the two digits of a signaling code otherwise transmitted by said connecting means.

7. The common-line communication system according to claim 6, wherein each of said dialing means is connected to key a voice frequency oscillator and wherein the output of said oscillator is connected to one of said telephone lines.

8. The common-line communication system according to claim 7 wherein said oscillator is shifted in frequency for each operation of said dialing means.

9. In combination, a plurality of common line transmission systems, switching means for connecting said systems serially together in response to a first code, means for disabling said switching means to disconnect said systems in response to a second code, each of said systems interconnecting a plurality of stations, means at each of said stations for selectively generating any one of a plurality of code digit groups including said first and second codes, an error correction code and station identification codes, said station codes being the same in each of said systems, means at each station responsive to said identification codes for signaling the identified station, means responsive to said error correction code to reset said signaling means, and means interposed between said systems for disabling said switching means to delete said error correction code otherwise transmitted by said switching means.

References Cited in the file of this patent

UNITED STATES PATENTS

| | | |
|---|---|---|
| 1,692,907 | Shackleton | Nov. 27, 1928 |
| 2,350,917 | Newby | June 6, 1944 |
| 2,380,232 | Gillings | July 10, 1945 |
| 2,892,893 | Pharis | June 30, 1959 |